(No Model.) 2 Sheets—Sheet 1.
J. A. JEFFREY.
CHAIN AND CHAIN MAKING.
No. 373,983. Patented Nov. 29, 1887.
Fig.1
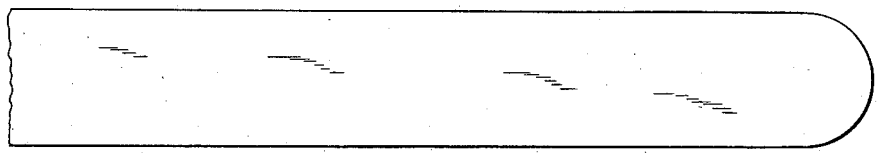
Fig.2
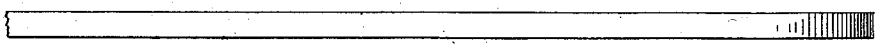
Fig.3
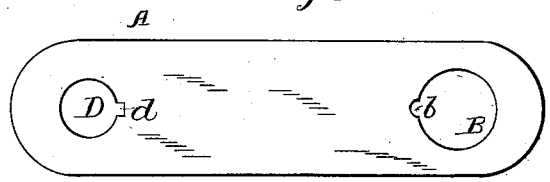
Fig.4
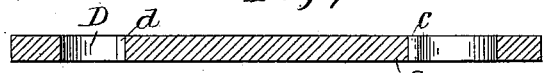
Fig.5
Fig.7
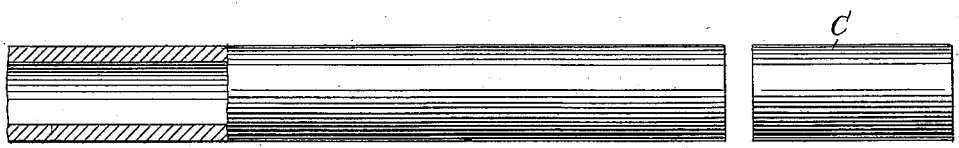
Fig. 8     Fig.11
 
Witnesses:
J. C. Turner
A. E. Burbage
Inventor:
Joseph A. Jeffrey
Doubleday & Bliss
attys.

(No Model.) 2 Sheets—Sheet 2.
J. A. JEFFREY.
CHAIN AND CHAIN MAKING.
No. 373,983. Patented Nov. 29, 1887.
Fig. 6
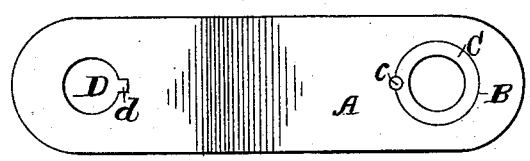
Fig. 10
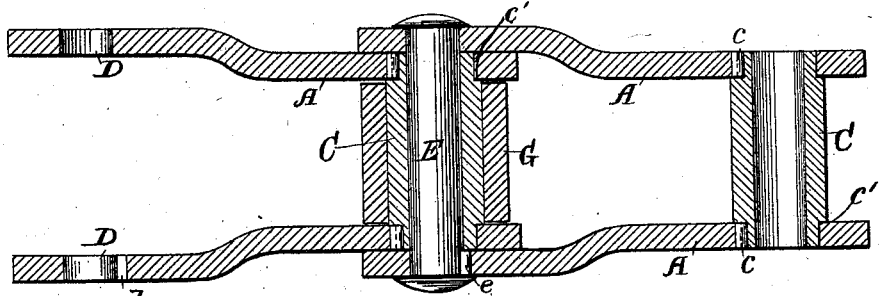
Fig. 12
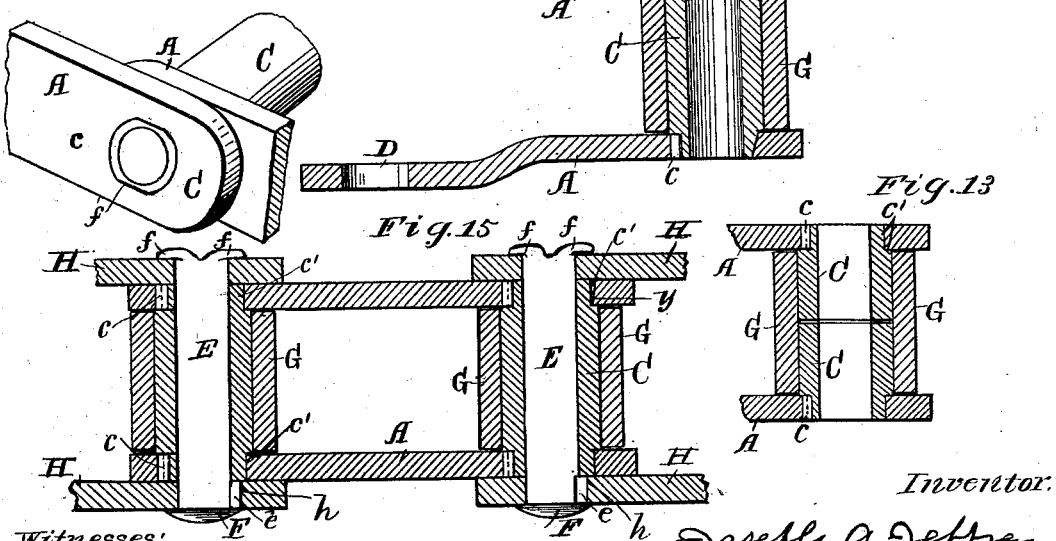
Fig. 14   Fig. 9
Fig. 15   Fig. 13
Witnesses:
J. C. Turner
R. E. Burbage
Inventor:
Joseph A. Jeffrey
by Doubleday & Bliss
attys.

UNITED STATES PATENT OFFICE.

JOSEPH A. JEFFREY, OF COLUMBUS, OHIO.

CHAIN AND CHAIN-MAKING.

SPECIFICATION forming part of Letters Patent No. 373,983, dated November 29, 1887.

Application filed August 22, 1887. Serial No. 247,532. (No model.)

*To all whom it may concern:*

Be it known that I, JOSEPH A. JEFFREY, a citizen of the United States, residing at Columbus, in the county of Franklin and State of Ohio, have invented certain new and useful Improvements in Chains and Chain-Making, of which the following is a specification, reference being had therein to the accompanying drawings.

Figure 1 is a face view of a strip of steel, wrought-iron, or other suitable metal, from which may be cut side bars adapted for my improved chain. Fig. 2 is an edge view of Fig. 1. Fig. 3 is a view of one of the finished side bars. Fig. 4 is a section of Fig. 3. Fig. 5 is an edge view of Fig. 3. Fig. 6 is a plan view of two of the bars in position. Fig. 7 is a side view of a tube from which can be cut the thimbles or tubular end bars. Fig. 8 shows the thimble ready for insertion. Fig. 9 is a section of a link after the parts have been secured together. Fig. 10 is a side view of the same. Fig. 11 shows the pintle detached. Fig. 12 is a plan view, partly in section, of the chain. Fig. 13 shows a modification in which the thimbles are made in sections. Fig. 14 shows a modification of the tubular end bar. Fig. 15 shows a rectangular link made in accordance with my invention.

In the drawings, A A represent the side bars of the links. They may be of any desired shape—as, for instance, straight, as shown in Fig. 15, or curved, as shown in Figs. 5, 9, and 12. They are formed of strips or bars of metal of such dimensions and weight as are required. For ordinary purposes I find that the bars do not need to be so thick or wide as to prevent them from being easily swaged into shape. However, so far as the side bars are concerned I do not wish to be limited to making them in this way.

At one end of each side bar there is a circular or other shaped seat, B, adapted to receive one end of the tubular end bar, C. By preference I also provide each of these seats with a notch, $b$.

The tubular end bars (or thimbles) are short sections of tubing, preferably of steel tubing, and are of substantially the right length to project through the side bars and be flush with their outer faces when the chain is finished. After these thimbles are cut into proper length they are inserted in the seats B B, securely fastened by riveting or upsetting, or by brazing, sweating, or any of the methods for fastening together two pieces of metal.

At $c$, I have shown a key driven firmly into the notch or key-seat $b$, and when desired there may be a corresponding key-seat in each end of the thimble. By one or another of these means a rigidity of connection is secured, and this thimble becomes a tubular end bar of the link. At the opposite end of the link its side bars are provided with pintle-seats D D, one or both of which may be provided with notches or key-seats $d$.

E is the pintle, circular in cross-section throughout, except that, by preference, it is provided with a lug, spline, or feather, $e$, adapted to enter one of the key-seats, and thus prevent the pintle from rotating relatively to either of the side bars in which it is thus mounted.

F is the head of the pintle, and $f\,f$ are short spurs or lugs projecting from its opposite end.

After the parts of the chain thus described are assembled accidental displacement of the pintles may be prevented by slightly bending outward the spurs $f\,f$, or the projecting end of the pintle may be slightly riveted or upset against the adjacent face of the side bar, thus dispensing with the spurs.

When it desired to use an anti-friction roller, G, it may be placed over the tubular end bar before the side bar is secured to the ends of the thimble.

Among the advantages which are incident to my invention are the following: First, great strength in proportion to weight is attained, from the fact that the side bars can be made with the fiber or grain running lengthwise, while at the same time all danger of weakening from unequal tension at the junction of the side bars and end bars is avoided; second, great accuracy in the length of the links can be attained; third, great accuracy in the fit of the articulating parts is insured; fourth, economy in manufacture; fifth, great durability and immunity from increase of length of chain during use, whereby a proper tracking of the chain upon the sprocket-wheels may be had, a matter of great importance where high speed and high tension are required. These capabilities are readily attained in my invention, as will be understood when it is remembered that the side bars can be produced in great quantities with almost unerring accuracy by the use of many of the well-known machines for punching and swaging, and that steel tubing of great uniformity of bore, of outside diameter, and contour can be produced at moderate cost. The locking of the pintles in their seats $d\,d$ insures that the wear shall occur at the points where the pintles engage with the tubular end bars, and the durability of these parts may be further increased by slightly tempering or otherwise hardening the engaging surfaces of both the tubular end bars and the pintles, or either of them.

In Fig. 13 each end bar is made in two sections, one of which is secured to its respective side bar. This construction has some advantages. For instance, the rollers can be applied after the thimbles have been secured to the side bars, and if either side bar or its thimble needs replacing at any time such parts can be taken out and duplicates put in. This is a quite important matter, particularly in large chains for exceedingly heavy work, to which a construction of this kind is especially applicable, and wherein each side bar is a heavy piece of metal, requiring considerable labor to produce, finish, and secure to its respective thimble-section.

Under some circumstances I propose to make the ends of the thimbles of somewhat reduced size, in order to effectually prevent the side bars from being forced too far upon the ends of said end bars. As shown, these reduced ends are of uniform diameter throughout, thus forming shoulders at $c'$; but these ends might be made tapering and yet secure substantially the same results.

In Fig. 14 the ends of the tubular end bar are slightly flattened or slabbed off, and their seats in the side bars are correspondingly shaped, whereby the placing of the upper and lower edges of the side bars in parallel planes is facilitated.

In Fig. 15 I have shown a rectangular link as contradistinguished from a U-shaped link. In this figure both end bars are formed of tube-sections or thimbles C C, like those of the other figures, except that their outer surface is cylindrical and of uniform diameter from end to end, instead of having their ends different in form. In this figure the alternate side bars, H H, may be duplicates of each other, each bar having at its ends duplicate pintle-seats, each provided with a notch, $h$, to receive the spline or feather of the pintle. In the chain shown in this Fig. 15, the tubular end bars may be each made in two parts of about equal lengths, separated from each other on the lines $x\,x$; or the tubular end bars may extend from one side bar across the entire width of the link to the opposite side bar, in which case the adjacent end of the side bar may have a seat of such diameter as will receive the end of the tubular end bar; or it may have a smaller seat of sufficient size to receive the pintle, as indicated at $y$, Fig. 15.

While I prefer to make both the side bars and tubular end bars of steel, yet it is apparent that many of the advantages which are incident to my invention may be attained by the use of malleable-iron side bars, which may be cast upon the thimble, or wrought-iron side bars. In fact, some of these advantages are obtainable with the use of tubing made of metal other than steel.

It will be readily understood that chains containing my invention can be run under high tension and at high speed with much less wear of the sprocket-wheels than results from the use of chains of the ordinary construction, whereby they are specially valuable under conditions which make it inconvenient (or otherwise undesirable) to take out the sprocket-wheels and put in new ones.

While I have set forth the best way now known to me for carrying my invention into effect, I do not wish to be limited to the details herein explained, because many modifications will naturally suggest themselves to any one skilled in the art of chain-making and without departing from the spirit of my invention.

What I claim is—

1. A chain-link having a tubular end bar formed of steel to receive the pintle, substantially as set forth.

2. A chain-link having a tubular end bar formed of steel, a steel pintle, and side bars connecting the pintles and the tubular end bars and pintles, substantially as set forth.

3. A chain-link having the side bars formed separately from each other, a pintle, and a tubular end bar formed separately from the side bars, substantially as set forth.

4. A chain-link having the side bars formed separately from each other, the pintle, and the tubular end bar for the pintle, formed separately from and rigidly secured to the side bars, substantially as set forth.

5. A chain-link having the side bars formed separately from each other, the pintle, and the tubular end bar formed in separable sections, each section being constructed separately from but rigidly secured to one of the side bars, substantially as set forth.

6. The herein-described chain-link, it having side bars formed with perforations at the ends, the thimble formed separately from the side bars and rigidly secured in the said perforations at the ends, and a pintle adapted to pass through such a thimble and to be fastened in place, as described.

7. The herein-described improvement in the art of making chain-links, it consisting in forming strips or bars to serve as side bars of the links, forming apertures in the said bars at the ends, cutting tubing into sections, inserting the said tube-sections into the apertures of the said side bars, and fastening the said tube-sections rigidly in place, substantially as set forth.

8. The combination, with the link having the side bars formed separately from each other, the tubular bearing formed separately from and rigidly secured to the said side bars, of the pintle situated in the said tubular bearing and the side bars of the adjacent link rigidly secured to the said pintle, substantially as set forth.

In testimony whereof I affix my signature in presence of two witnesses.

JOSEPH A. JEFFREY.

Witnesses:
T. M. LIVESAY,
A. C. WILLIAMS.